Patented July 3, 1934

1,965,160

UNITED STATES PATENT OFFICE 1,965,160

VULCANIZATION OF RUBBER

Winfield Scott, Nitro, W. Va., assignor to The Rubber Service Laboratories Co., Akron, Ohio, a corporation of Ohio No Drawing. Application September 14, 1929, Serial No. 392,733

10 Claims. (Cl. 18—53)

The present invention relates to the vulcanization of rubber by an improved process wherein a nitro-phenyl aryl-thiazyl-disulfid, preferably obtained by reacting a mercapto aryl thiazole with a nitro or a nitro and halogen substituted derivative of an aryl sulfur halide, is employed as a vulcanization accelerator. The preferred class of compounds may be incorporated alone in a rubber mix as an accelerator but preferably they are employed in conjunction with a basic organic nitrogen-containing accelerating compound to form a mixed accelerator. More specifically, however, the preferred class of compounds are employed in conjunction with an amine accelerating compound, for example, diphenyl-guanidine, to form a mixed accelerator.

Moreover, it is not necessary that the basic organic nitrogen-containing compound employed in conjunction with the preferred class of compounds be strongly basic. Organic nitrogen-containing accelerating compounds weakly basic in nature have been found to function as valuable activators for the nitro-phenyl aryl-thiazyl-disulfids.

The use of the preferred class of accelerating compounds in a rubber mix will be readily understood from the following description and examples.

One of the preferred class of accelerators, for example, 2-nitro phenyl benzo-thiazyl-disulfid, prepared from the potassium salt of mercapto-benzo-thiazole and ortho nitro phenyl sulfur chloride was compounded in a rubber mix comprising

|  | Parts |
| --- | --- |
| Pale crepe rubber | 100 |
| Zinc oxide | 5 |
| Sulfur | 2 |
| 2-nitro phenyl benzo-thiazyl-disulfid | 0.5 |

Test strips of the above described stock on vulcanizing by heating in the usual manner in a press for thirty minutes at the temperature given by forty pounds of steam pressure per square inch possessed a tensile strength at break of 1780 pounds per square inch and an ultimate elongation of 933%. These test figures show that 2-nitro-phenyl benzo-thiazyl-disulfid possesses accelerating power. This material is, however, preferably employed in conjunction with a basic organic nitrogen-containing accelerating compound to form a mixed accelerator. Thus a portion of this material was incorporated in a rubber stock comprising

|  | Parts |
| --- | --- |
| Pale crepe rubber | 100 |
| Zinc oxide | 5 |
| Sulfur | 3.5 |
| 2-nitro-phenyl benzo-thiazyl-disulfid | 0.3 |
| Diphenyl-guanidine | 0.6 |

The rubber mix was then vulcanized by heating in a press for the times and at the pressure conditions indicated in the following table in which are set forth the physical characteristics of the cured rubber stock.

Table I

| Cure minutes | Steam pressure pounds | Modulus of elasticity in lbs/in² at elongations of | | | Tensile in lbs/in² at break | Percent ultimate elongation |
| --- | --- | --- | --- | --- | --- | --- |
| | | 300% | 500% | 700% | | |
| 30 | 20 | 157 | 474 | 2278 | 3610 | 760 |
| 60 | 20 | 210 | 790 | 3660 | 4565 | 725 |
| 10 | 40 | 199 | 546 | 2478 | 3770 | 790 |
| 20 | 40 | 197 | 800 | 3608 | 4625 | 750 |
| 30 | 40 | 245 | 1045 | 4110 | 4160 | 700 |

The above results show that the preferred class of vulcanization accelerators possess greatly increased accelerating power when employed as a component of a mixed accelerator in conjunction with a basic activator, specifically diphenyl-guanidine.

The compound 2-nitro-phenyl benzo-thiazyl-disulfid has also been employed in conjunction with diphenyl-guanidine in a tread stock. Thus a rubber stock was compounded in the usual manner comprising

|  | Parts |
| --- | --- |
| Pale crepe rubber | 50 |
| Smoked sheet rubber | 50 |
| Zinc oxide | 15 |
| Carbon black | 42 |
| Stearic acid | 2 |
| A blended mineral oil and rosin | 1.5 |
| Sulfur | 3 |
| 2-nitro-phenyl benzo-thiazyl-disulfid | 0.2 |
| Diphenyl-guanidine | 0.8 |

The rubber mix was then vulcanized by heating in a press for different periods of time at the temperature given by twenty pounds of steam pressure per square inch. On testing strips of the thus vulcanized rubber product, the following tensile data were obtained:

Table II

| Cure minutes | Modulus of elasticity in lbs/in² at elongations of 300% | Tensile in lbs/in² at break |
| --- | --- | --- |
| 40 | 573 | 1755 |
| 60 | 913 | 3810 |
| 90 | 1273 | 4825 |

The preferred class of compounds have been employed in conjunction with other basic organic nitrogen-containing accelerators. Thus 2-nitrophenyl benzo-thiazyl-disulfid was compounded in a rubber stock comprising

| | Parts |
|---|---|
| Pale crepe rubber | 50 |
| Smoked sheet rubber | 50 |
| Zinc oxide | 15 |
| Carbon black | 42 |
| Stearic acid | 2 |
| A blended mineral oil and rosin | 1.5 |
| Sulfur | 3.0 |
| 2-nitro-phenyl benzo-thiazyl-disulfid | 0.4 |
| Methylene di-piperidine | 0.2 |

On vulcanizing and testing the vulcanized rubber product, the following tensile data were obtained:

*Table III*

| Cure minutes | Steam pressure pounds | Modulus of elasticity in lbs/in² at elongations of 300% | Tensile in lbs/in² at break |
|---|---|---|---|
| 40 | 20 | 723 | 2760 |
| 60 | 20 | 971 | 3048 |
| 90 | 20 | 1230 | 4673 |
| 120 | 20 | 1470 | 4920 |

The preferred accelerating compound 2-nitro-phenyl benzo-thiazyl-disulfid has been employed together with 2,4-diamino diphenylamine as a mixed accelerator. A rubber stock was compounded comprising

| | Parts |
|---|---|
| Pale crepe rubber | 50 |
| Smoked sheet rubber | 50 |
| Zinc oxide | 15 |
| Carbon black | 42 |
| Stearic acid | 2 |
| A blended mineral oil and rosin | 1.5 |
| Sulfur | 3.0 |
| 2,4-diamino diphenylamine | .4 |
| 2-nitro-phenyl benzo-thiazyl disulfid | .2 |

This compounded rubber stock was then vulcanized and the cured product so obtained on testing showed the following characteristics:

*Table IV*

| Cure minutes | Steam pressure pounds | Modulus of elasticity in lbs/in² at elongations of 300% | Tensile in lbs/in² at break |
|---|---|---|---|
| 40 | 20 | 556 | 2155 |
| 60 | 20 | 777 | 2725 |
| 90 | 20 | 1128 | 3800 |
| 120 | 20 | 1195 | 4090 |
| 180 | 20 | 1353 | 4335 |

As another example wherein the preferred class of accelerators are employed with a basic organic nitrogen-containing accelerator to form a mixed accelerator, a rubber stock was compounded comprising

| | Parts |
|---|---|
| Pale crepe rubber | 50 |
| Smoked sheet rubber | 50 |
| Zinc oxide | 15 |
| Carbon black | 42 |
| Stearic acid | 2 |
| A blended mineral oil and rosin | 1.5 |
| Sulfur | 3.0 |
| 2-nitro-phenyl benzo-thiazyl-disulfid | .4 |
| Piperidine | 0.1 |

The compounded rubber stock was vulcanized and, on testing, the tensile data given in the following table were obtained:

*Table V*

| Cure minutes | Steam pressure pounds | Modulus of elasticity in lbs/in² at elongations of 300% | Tensile in lbs/in² at break |
|---|---|---|---|
| 60 | 20 | 637 | 2188 |
| 90 | 20 | 951 | 3328 |
| 120 | 20 | 1090 | 3645 |
| 180 | 20 | 1320 | 3720 |
| 240 | 20 | 1510 | 4050 |

The foregoing examples adequately show that the use of the preferred class of rubber vulcanization accelerators in conjunction with another accelerator is not limited to any particular class of basic organic nitrogen-containing accelerators. The use of both primary and secondary amines in conjunction with nitro-phenyl aryl-thiazyl-disulfids to form a mixed accelerator has hereinbefore been disclosed. In all cases, the mixed accelerator has functioned to produce a vulcanized rubber product of high quality.

Schiff's bases likewise have been employed in conjunction with nitro-phenyl aryl-thiazyl-disulfids to form mixed accelerators of the rubber vulcanization process. A rubber mix was compounded comprising:

| | Parts |
|---|---|
| Pale crepe rubber | 50 |
| Smoked sheet rubber | 50 |
| Zinc oxide | 15 |
| Carbon black | 42 |
| Stearic acid | 2 |
| A blended mineral oil and rosin | 1.5 |
| Sulfur | 3.0 |
| 2-nitro-phenyl benzo-thiazyl-disulfid | 0.5 |
| Methylene dianilide | 0.5 |

After vulcanizing the above rubber stock by heating in a press for different periods of time at the temperature given by twenty pounds of steam pressure per square inch, a cured rubber product having the following properties was obtained:

*Table VI*

| Cure minutes | Modulus of elasticity in lbs/in² at elongations of 300% | Tensile in lbs/in² at break |
|---|---|---|
| 40 | 541 | 2450 |
| 60 | 833 | 3488 |
| 90 | 1170 | 4340 |
| 120 | 1358 | 4725 |

It is apparent from the above results that a very valuable rubber vulcanization accelerator is formed when a Schiff's base is employed with a nitro-phenyl aryl-thiazyl disulfid to form a mixed accelerator.

Furthermore, it is not necessary that the basic organic nitrogen-containing compounds themselves be employed with the new class of vulcanization accelerators hereinbefore disclosed. The salts thereof, formed by reacting the base with an organic acid, have also been found to comprise activators of the new class of compounds, when employed in a rubber mix of vulcanization characteristics.

Piperidine stearate was employed together with 2-nitro-phenyl benzo-thiazyl disulfid in a rubber mix comprising

| | Parts |
|---|---|
| Pale crepe rubber | 50 |
| Smoked sheet rubber | 50 |
| Zinc oxide | 15 |
| Carbon black | 42 |
| Stearic acid | 2 |
| A blended mineral oil and rosin | 1.5 |
| Sulfur | 3.0 |
| 2-nitro-phenyl benzo-thiazyl-disulfid | 0.4 |
| Piperidine stearate | 1.0 |

Portions of this compounded rubber stock were cured by heating in a press for different times at the temperature given by twenty pounds of steam pressure per square inch. On testing the vulcanized rubber product, the tensile data given in the following table were obtained.

Table VII

| Cure minutes | Modulus of elasticity in lbs/in² at elongations of 300% | Tensile in lbs/in² at break |
|---|---|---|
| 40 | 733 | 3463 |
| 60 | 1220 | 4335 |
| 90 | 1510 | 4555 |
| 120 | 1510 | 4820 |

As another example wherein a salt of a basic organic nitrogen-containing compound was employed in conjunction with a nitro-phenyl benzo-thiazyl-disulfid, diethylamine stearate was incorporated in the usual manner in the following rubber mix

| | Parts |
|---|---|
| Pale crepe rubber | 50 |
| Smoked sheet rubber | 50 |
| Zinc oxide | 15 |
| Carbon black | 42 |
| Stearic acid | 2 |
| A blended mineral oil and rosin | 1.5 |
| Sulfur | 3.0 |
| Diethylamine stearate | 1.0 |
| 2-nitro-phenyl benzo-thiazyl-disulfid | 0.4 |

Portions of this compounded stock were vulcanized by heating in the usual manner under twenty pounds of steam pressure per square inch. The tensile data obtained on testing the cured rubber product is given in the following table.

Table VIII

| Cure minutes | Modulus of elasticity in lbs/in² at elongations of 300% | Tensile in lbs/in² at break |
|---|---|---|
| 40 | 615 | 2380 |
| 60 | 1140 | 3855 |
| 90 | 1388 | 4510 |
| 120 | 1493 | 4750 |

The foregoing tensile data set forth in Tables VII and VIII show clearly that the salts of basic organic nitrogen-containing compounds function as activators of and may be used in conjunction with the new class of compounds to form a valuable mixed accelerator.

A rubber stock has been prepared in which more than one basic organic nitrogen-containing compound has been employed at the same time with a nitro-phenyl benzo-thiazyl-disulfid to form a mixed accelerator. Such a stock comprised

| | Parts |
|---|---|
| Pale crepe rubber | 50 |
| Smoked sheet rubber | 50 |
| Zinc oxide | 15 |
| Carbon black | 42 |
| Stearic acid | 2 |
| A blended mineral oil and rosin | 1.5 |
| Sulfur | 3.0 |
| 2-nitro-phenyl benzo-thiazyl-disulfid | 0.3 |
| Diphenyl-guanidine | 0.2 |
| Methylene dianilide | 0.3 |
| 2,4-diamino diphenylamine | 0.2 |

On vulcanizing the above stock and testing the cured rubber product, it was found to have the following tensile characteristics.

Table IX

| Cure minutes | Steam pressure lbs. | Modulus of elasticity in lbs/in² at elongations of 300% | Tensile in lbs/in² at break |
|---|---|---|---|
| 40 | 20 | 708 | 3140 |
| 60 | 20 | 1012 | 3705 |
| 90 | 20 | 1375 | 4690 |
| 120 | 20 | 1595 | 4835 |

Another example of the preferred class of compounds is 2-nitro-phenyl, 6-nitro-benzo-thiazyl disulfid, prepared by reacting the sodium salt of 6-nitro, 2-mercapto-benzo-thiazole with ortho nitro phenyl sulfur chloride. This material, on incorporating alone as an accelerator in a rubber stock, exhibited vulcanization accelerating properties. It is, however, preferable to employ the product in conjunction with a basic organic nitrogen-containing accelerating compound, specifically diphenyl-guanidine. Thus, a rubber stock was prepared in the usual manner comprising

| | Parts |
|---|---|
| Pale crepe rubber | 100 |
| Zinc oxide | 5 |
| Sulfur | 3.5 |
| Diphenyl-guanidine | .5 |
| 2-nitro-phenyl, 6-nitro-benzo-thiazyl disulfid | .25 |

The rubber mix after vulcanization by heating in a press exhibited the tensile characteristics indicated in Table X.

Table X

| Cure minutes | Steam pressure lbs. | Modulus of elasticity in lbs/in² at elongations of | | | Tensile in lbs/in² at break | Percent ultimate elongation |
|---|---|---|---|---|---|---|
| | | 300% | 500% | 700% | | |
| 15 | 40 | 92 | 210 | 975 | 2293 | 850 |
| 30 | 40 | 114 | 318 | 1400 | 2620 | 805 |
| 45 | 40 | 108 | 365 | 1628 | 2950 | 810 |
| 60 | 40 | 117 | 421 | 1750 | 2875 | 790 |

A further example of the preferred class of vulcanization accelerating compounds comprises 2-nitro, 4-chloro-phenyl, 6-nitro-benzo-thiazyl disulfid prepared by reacting the sodium salt of 6-nitro, 2-mercapto-benzo-thiazole with 2-nitro, 4-chlorphenyl sulfur chloride. This product was found to possess accelerating power when incorporated alone as a vulcanization accelerator in a compounded rubber stock. It is preferably employed, however, in conjunction with a basic organic nitrogen-containing accelerator. In this manner greatly increased accelerating properties are shown as indicated below.

A rubber stock was compounded comprising

| | Parts |
|---|---|
| Pale crepe rubber | 100 |
| Zinc oxide | 5 |
| Sulfur | 3.5 |
| Diphenyl-guanidine | .5 |
| 2-nitro, 4-chlorophenyl, 6-nitro-benzo-thiazyl disulfid | .25 |

On testing strips of the above stock, vulcanized by heating in a press for different periods of time at the temperature given by forty pounds of steam, the tensile data appearing in Table XI were obtained.

*Table XI*

| Cure minutes | Steam pressure lbs. | Modulus of elasticity in lbs/in² at elongations of | | | Tensile in lbs/in² at break | Percent ultimate elongation |
|---|---|---|---|---|---|---|
| | | 300% | 500% | 700% | | |
| 15 | 40 | 84 | 204 | 805 | 2105 | 870 |
| 30 | 40 | 93 | 257 | 1165 | 2650 | 840 |
| 45 | 40 | 119 | 348 | 1440 | 2850 | 820 |
| 60 | 40 | 122 | 369 | 1498 | 2895 | 820 |

Alkyl substituted mercapto-aryl-thiazoles have also been reacted with nitro and halogen substituted phenyl sulfur halides to form the preferred class of vulcanization accelerators.

Thus 2-nitro, 4-chlorphenyl, 6-methyl benzo-thiazyl disulfid was prepared by reacting the sodium salt of 6 - methyl, 2 - mercapto - benzo-thiazole with 2 - nitro, 4 - chlorphenyl sulfur chloride. This product, on incorporation alone as a vulcanization accelerator in a pure gum stock comprising 100 parts of pale crepe rubber, 5 parts of zinc oxide, 3.5 parts of sulfur, and 0.75 parts of accelerator and vulcanizing by heating in a press for 45 minutes at forty pounds of steam pressure per square inch produced a rubber product having a tensile strength at break of 1865 pounds per square inch and an ultimate elongation of 915%. These accelerating properties, however, were materially increased when employed in conjunction with a basic activator accelerator. A rubber stock was compounded comprising

| | Parts |
|---|---|
| Pale crepe rubber | 100 |
| Zinc oxide | 5 |
| Sulfur | 3.5 |
| Diphenyl-guanidine | .5 |
| 2-nitro, 4-chlorphenyl, 6-methyl benzo thiazyl disulfid | .25 |

Test strips of this compounded rubber stock vulcanized by heating in a press in the usual manner for forty-five minutes at forty pounds of steam pressure per square inch, on testing were found to possess a tensile strength at break of 3035 pounds per square inch and an ultimate elongation of 825%. An identical rubber stock wherein 0.75 parts of diphenyl-guanidine was employed as the accelerator in place of the mixed accelerator described above gave a complete cure in forty-five minutes at forty pounds of steam pressure per square inch. The rubber stock thus vulcanized possessed a tensile strength at break of only 2730 pounds per square inch and an ultimate elongation of 850%. These data show the preferred type of mixed accelerators produce a vulcanized rubber product possessing superior characteristics to that obtained when the same quantity of either of its components are employed alone as accelerators.

Other examples of the preferred class of compounds are 2-nitro phenyl, 5-chloro-benzo-thiazyl disulfid and 2-nitro, 4-chloro phenyl, 5-chloro-benzo-thiazyl disulfid. The former of these two compounds was prepared by reacting the sodium salt of 5-chlor, 2-mercapto-benzo-thiazole with ortho-nitro-phenyl sulfur chloride, while the latter compound was prepared by reacting the sodium salt of 5-chloro, 2-mercapto-benzo-thiazole with 2-nitro, 4-chloro-phenyl sulfur chloride. These products when employed alone as accelerators in pure gum stocks showed accelerating properties. The preferred method of their use is, however, in conjunction with a basic organic nitrogen-containing activator accelerator, preferably a guanidine, specifically diphenyl-guanidine, as a mixed accelerator. Thus, a rubber stock was compounded comprising

| | Parts |
|---|---|
| Pale crepe rubber | 100 |
| Zinc oxide | 5 |
| Sulfur | 3.5 |
| Diphenyl-guanidine | .5 |
| Accelerator | .25 |

On testing strips of the above rubber stocks, cured by heating in a press for one hour at forty pounds steam pressure per square inch, a tensile strength at break of 3158 pounds per square inch and an ultimate elongation of 780% was obtained for the rubber product in which 2-nitro phenyl, 5-chlor-benzo-thiazyl disulfid was employed as a component of the preferred mixed accelerator; a tensile at break of 3255 pounds per square inch and an ultimate elongation of 795% was obtained for the vulcanized rubber product in which 2-nitro, 4-chlor-phenyl, 5-chlor-benzo-thiazyl-disulfid was empolyed as one component of the preferred mixed accelerator.

The foregoing results very clearly show the desirable accelerating properties of the class of compounds and mixtures thereof as herein disclosed.

Other mercapto-aryl-thiazoles than those hereinbefore disclosed may be reacted with a nitro or a nitro and halogen substituted derivative of an aryl sulfur chloride to form the preferred class of compounds. Thus, the xylyl thiazoles and the like may be reacted with a nitro or a nitro and halogen substituted derivative of phenyl or tolyl sulfur chloride and the like to form the desired aryl derivative of an aryl-thiazyl disulfid, and if desired may be employed in conjunction with a basic organic nitrogen-containing accelerator such, for example, as diortho-tolyl-guanidine, diphenyl - guanidine, diamino diphenylamine, methylene dianilid, piperidine, piperidine stearate, diethylamine stearate, methylene dipiperidine and the like to form a mixed accelerator.

The foregoing examples are to be understood as illustrative only and not at all limitative of the invention. Other vulcanized products may be obtained by employing other compounding ingredients and other proportions of ingredients than those particularly set forth in the examples.

What is claimed is:

1. The process of producing vulcanized rubber which comprises heating rubber and sulfur in the presence of a vulcanization accelerating product comprising 2-nitro phenyl benzo-thiazyl disulfid as a constituent thereof.

2. The process of producing vulcanized rubber which comprises heating rubber and sulfur in the presence of a mixture of accelerators, said accelerators comprising 2-nitro-phenyl benzothiazyl disulfid and diphenyl-guanidine.

3. The vulcanized rubber product prepared by heating rubber and sulfur in the presence of a vulcanization accelerating product containing 2-nitro-phenyl benzo-thiazyl disulfid as a constituent thereof.

4. The vulcanized rubber product prepared by heating rubber and sulfur in the presence of a mixture of accelerators, said accelerators comprising 2-nitro-phenyl benzo-thiazyl disulfid and diphenyl-guanidine.

5. The process of producing vulcanized rubber which comprises heating rubber and sulfur in the presence of one member of a group consisting of 2-nitro-phenyl benzo-thiazyl disulfid; 2-nitrophenyl, 6-nitro-benzo-thiazyl disulfid; 2-nitro, 4-chloro-phenyl, 6-nitro-benzo-thiazyl disulfid; 2-nitro, 4-chloro-phenyl, 6-methyl-benzo-thiazyl disulfid; 2-nitro-phenyl, 5-chloro-benzo-thiazyl disulfid and 2-nitro, 4-chloro-phenyl, 5-chlorobenzo-thiazyl disulfid.

6. The vulcanized rubber product prepared by heating rubber and sulfur in the presence of one member of a group consisting of 2-nitrophenyl benzo-thiazyl disulfid; 2-nitro-phenyl, 6-nitro-benzo-thiazyl disulfid; 2-nitro, 4-chlorophenyl, 6-nitro-benzo-thiazyl disulfid; 2-nitro, 4-chloro-phenyl, 6-methyl-benzo-thiazyl disulfid; 2-nitro-phenyl, 5-chloro-benzo-thiazyl disulfid and 2-nitro, 4-chloro-phenyl, 5-chloro-benzothiazyl disulfid.

7. The process of producing vulcanized rubber which comprises heating rubber and sulfur in the presence of a vulcanization accelerating product containing a nitro phenyl aryl thiazyl disulfide as a constituent thereof, the hydrogen atoms of said nitro phenyl radical being replaceable by halogen and methyl substituents only.

8. The vulcanized rubber product prepared by heating rubber and sulfur in the presence of a vulcanization accelerating product containing a nitro phenyl aryl thiazyl disulfide as a constituent thereof, the hydrogen atoms of said nitro phenyl radical being replaceable by halogen and methyl substituents only.

9. The process of producing vulcanized rubber which comprises heating rubber and sulfur in the presence of a vulcanization accelerating product containing a nitro phenyl aryl thiazyl disulfide as a constituent thereof, said nitro phenyl radical containing no additional substituents.

10. The vulcanized rubber product prepared by heating rubber and sulfur in the presence of a vulcanization accelerating product containing a nitro phenyl aryl thiazyl disulfide as a constituent thereof, said nitro phenyl radical containing no additional substituents.

WINFIELD SCOTT.